Patented Mar. 25, 1941

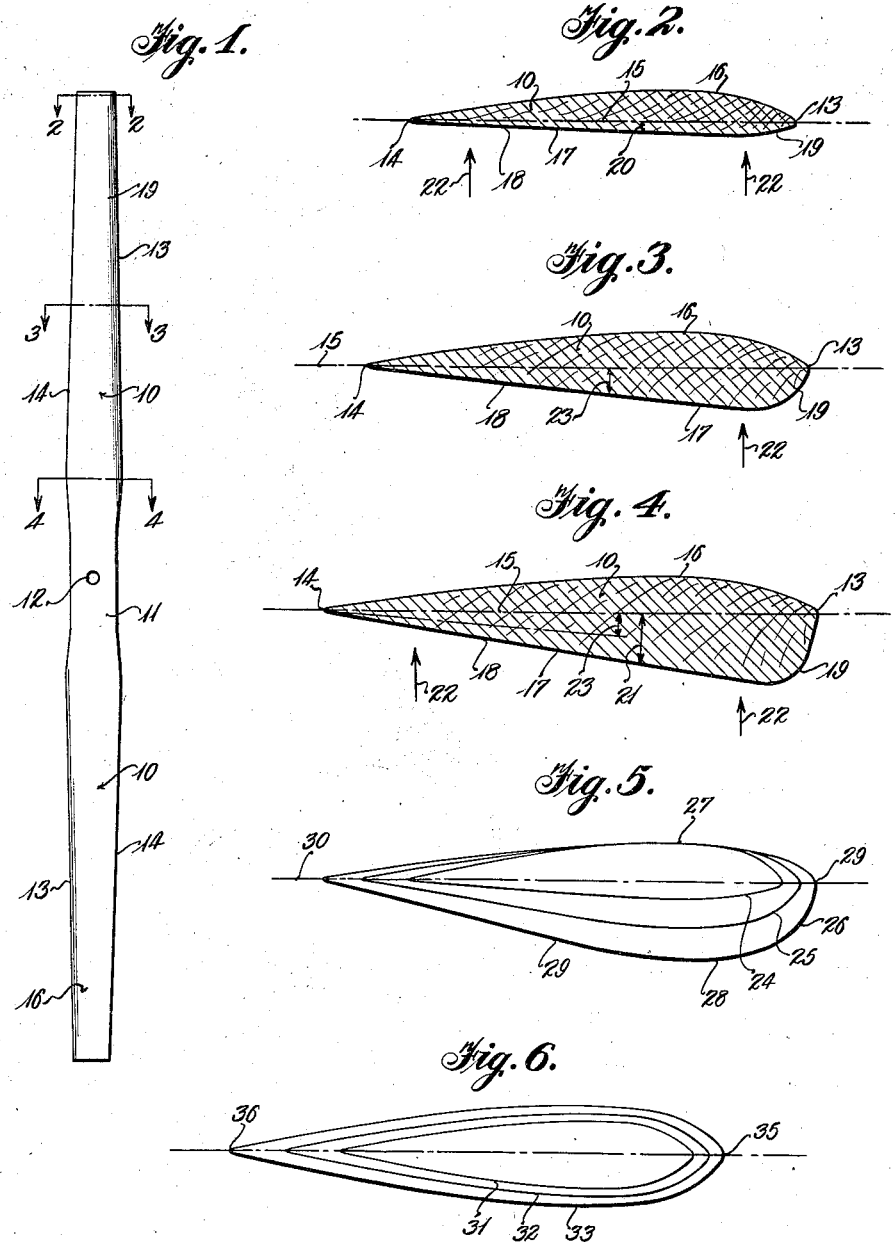

2,236,494

UNITED STATES PATENT OFFICE 2,236,494

WIND DRIVEN IMPELLER

Gerhard H. Albers, Sioux City, Iowa, assignor to Wincharger Corporation, Sioux City, Iowa, a corporation of Minnesota Application December 16, 1939, Serial No. 309,673

9 Claims. (Cl. 170—79)

This invention relates to rotatable impellers for wind driven power apparatus and more particularly to impellers of the high speed type, that is, impellers having a high tip speed ratio.

I have found that impellers having blades of double convex symmetrical airfoil configuration having no pitch setting provide excellent high speed operation for power apparatus, if given an initial rotation. That is, blades of the type mentioned, in which the trailing and leading edges of the blade at any radial position along the blade are substantially in a plane normal to the axis of rotation of the impeller, continue to rotate at high speed and develop power with low losses due to friction and turbulence of the air. Such impellers will continue to rotate and develop usable power even if the blades are given a slight positive pitch, for example, a pitch between 1° and 3° and in some cases even up to 5°, but appear to reach their maximum efficiency in the neighborhood of zero pitch. Impellers of this type, however, are not ordinarily self-starting and require a starting mechanism for giving initial rotation. By giving the blades a slight negative pitch they become self-starting but blades having a pitch sufficient to cause starting in light winds begin to have the characteristics of ordinary pitched wind wheels and have lowered efficiency.

The present invention contemplates impellers of the types above described but is chiefly concerned with impeller blades which retain in a large degree the desirable characteristics of the non-pitched symmetrical airfoil type but are modified therefrom to provide starting surfaces so that the impellers are self-starting, even in low wind velocities. The impeller blades of the present invention preferably have their trailing and leading edges at any radial position along the blade in a plane normal to the axis of rotation of the impeller, although in certain instances this construction may be slightly departed from.

Impellers of the present invention may be made of any suitable material but are particularly adaptable to being formed of a unitary wooden member and can be simply formed therefrom with minimum waste so as to produce mechanically strong constructions having thickened sections at the points of maximum stress. Thus, the impellers of the present invention are substantially free from vibration and fluttering of the blade tips and retain their original form for extended periods of time.

It is, therefore, an object of the present invention to provide a rotatable impeller for wind driven power apparatus, the blades of which are of double convex airfoil section and in which the trailing and leading edges at any radial position along the blade are substantially in a plane normal to the axis of rotation of the impeller.

Another object of the invention is to provide an impeller blade for wind driven power apparatus which has its trailing and leading edges at any radial position along the blade substantially in a plane normal to the axis of rotation of the impeller and which is provided with a starting surface for insuring initial rotation of the impeller.

A further object of the invention is to provide an improved impeller for wind driven apparatus which can be cut from blank stock with minimum waste of material to produce a blade which is rigid and of maximum strength at the points of maximum stress.

A still further object of the invention is to provide an impeller blade for wind driven power apparatus in which the blade is of double convex airfoil form and which can be easily formed from blank stock with minimum waste of material.

Other objects and advantages of the invention will appear in the following description of preferred embodiments of the invention shown in the attached drawing, of which:

Figure 1 is a forward elevation of an impeller structure.

Figure 2 is an enlarged sectional view taken directly through the tip of the blade along the line 2—2 of Figure 1.

Figure 3 is a view similar to Figure 1 through an intermediate portion of the blade along the line 3—3 of Figure 1.

Figure 4 is a view similar to Figure 1 taken adjacent the hub portion of the blade along the line 4—4 of Figure 1.

Figure 5 is a diagrammatic view showing the outlines of blade sections of a modified form of the impeller blade; and Figure 6 is a view similar to Figure 5 showing the outline of blade sections of a still further modified form of blade.

The preferred form of the invention is shown in Figures 1 to 4 and will be first described. In these figures, 10 indicates identical blades of a two-blade impeller provided with a hub portion 11. The hub portion 11 may be provided with an opening 12 or any other suitable means for attachment to a shaft connected to any suitable power take off apparatus, for example, an electric generator. Since the blades 10 are identical, it is necessary to describe only one blade. While a two-blade integral construction is disclosed, it will be understood that structures having a greater number of blades are within the contemplation of the present invention although the impellers will, in general, have a relatively few number of blades so as to prevent interference between the blades and provide for high speed operation. It will be noted that the impeller blade is thickened adjacent the leading edge 13 and tapers toward the trailing edge 14 in a manner providing an impeller blade of double convex airfoil form at all sections of the blade. In the structure of Figs. 1 to 4, the leading and trailing edges of the blade are positioned in a plane normal to the axis of rotation of the impeller and this plane is indicated by the dotted line 15 in Figs. 2 to 3. The line through the leading and trailing edges of the blade will be herein referred to as the pitch line of the blade, and it will be noted that the impeller blade illustrated has no pitch.

In the present application the term "rearward face" will be employed to designate the face of the blade away from the wind and the term "forward face" will be employed to designate the windward face of the blade. In the preferred construction the rearward face 16 of the impeller blade is given an airfoil curve which is similar at all sections of the blade as shown in Figs. 2 to 4. It is possible to employ sections of the same curve for the airfoil of face 16 at all portions of the blade so that this face may be cut by properly guiding the blank stock in engagement with a single rotating cutter. As hereafter more completely discussed with reference to Figure 6, the face 17 of the blade could be given the same airfoil curve as the curve described with reference to the face 16 to form a symmetrical double convex airfoil blade. Such a blade continues to rotate and develop power when exposed to the wind and given an initial rotation even though the leading and trailing edges are in the plane of rotation of the impeller. It will be noted that the mid section of the blade as shown in Figure 3 approaches this symmetrical structure. It has been found, however, that the forward face of the blade 17 can be formed as shown in Figs. 2 to 4 to provide a starting surface so that the blade is self-starting while largely retaining the characteristics of the symmetrical type referred to. Thus, the forward face 17 may be provided with a sloping surface 18 extending from the trailing edge 14 to a point adjacent the leading edge 13 where it merges into a curved portion 19 extending between the starting surface 18 and the leading edge 13. The surface 18 may have straight line elements in a circumferential direction between the trailing edge 14 and its point of juncture with the curve portion 19. The surface 18 occupies a major portion of the forward face of the blade and has a minimum angle with respect to the plane of rotation at the tip of the blade, as indicated by the reference numeral 20, which gradually changes to a maximum angle adjacent the hub of the plane as indicated on Figure 4 by the reference numeral 21. The surface 18 presents a sloping surface to the wind, the direction of which is shown by the arrows 22. The effect is similar to the negative slope of a pitched blade and initiates movement of the blade when the impeller is directed into the wind. It will be noted that the thickest portion of the blade is adjacent the hub of the impeller and that the blade gradually tapers to a minimum section adjacent the tip so that an extremely rigid blade is produced having its greatest thickness at the portion of maximum stress on the blade. The blade of the present invention, however, differs from a pitched blade in that the airfoil section between the line 15 and the face 16 has no pitch and the resulting blade rotates at a higher speed and develops greater power than a conventionally pitched blade.

The starting surface 18, in a preferred construction, makes an angle of approximately 2° with the plane of rotation at the tip portion of the blade and an angle of approximately 9° adjacent the hub. These angles are indicated by the reference numerals 20 and 21, on Figures 2 and 4, respectively. The reference character 23 designates the approximate angle of the surface 18 at the mid section shown in Fig. 3, which angle is substantially 5½°. It will be appreciated that the slope of the surface 18 may vary from the precise figures given, the essential factors being that the surface 18 be of sufficient extent and that at least a portion thereof make sufficient angle with the plane of rotation to produce an initial starting of the blade. In the blade just described, the surface 18 comprises a warped surface having straight line elements extending between the trailing edge 14 and the point of juncture between the surface 18 and the curve surface 19 adjacent the leading edge of the blade. As in the case of the face 16, the complete curve of the forward face 17 may be made sections of the same curve so that a single cutter may be employed to cut the entire face 17 by properly guiding the impeller blade past the cutter.

As shown in Figure 5, it is not essential that the starting surface of the blade be made up of straight line elements. In Figure 5 the tip section 24 of a modified form of blade is shown superimposed upon a midsection 25 and a section 26 adjacent the hub of a blade. The rearward face of the blade 27 may have an airfoil curve entirely similar to the airfoil curve of the face 16 of Figs. 2 to 4. The forward face 28 of the blade may be of curved form throughout but the hub section 26 thereof is made much thicker between the line 30 indicating the plane of rotation and the forward face 28 than is the corresponding portion of the blade between the line 30 and the rearward face 27. The blade tapers to a section 24 adjacent the tip of the blade in which the portion of the blade is thicker between the line 30 and the rearward face 27 than between the line 30 and the forward face 28. This structure also provides a self-starting blade having a starting surface 29. The starting effect, however, is not as great as the blade of Figs. 1 to 4 and the blade is somewhat more difficult to shape. However, as in the case of the blade of Figs. 1 to 4, the curves of the forward face at any portion of the blade may all be portions of the same blade so that a single cutter may be employed to shape the forward face.

In Figure 6, I have shown superimposed sections 31, 32 and 33 representing the sections adjacent the tip, intermediate portion and hub portion, respectively, of a blade having a symmetrical double convex airfoil form in which the leading edge 35 and trailing edge 36 are in the plane of rotation of the impeller so that the blade has no pitch. An impeller having blades of the form shown in Fig. 6 will rotate at a rapid rate of speed and develop power if given initial rotation. Such a blade can, however, be practically employed only if the impeller is provided with starting mechanism such as, for example, shown in Patent No. 2,086,279, granted July 6, 1937, to E. F. McDonald, Jr. The blades of Figures 1 to 4 and also the blade of Figure 5 are modifications of the blade of Figure 6, but provide starting surface for causing the blade to be self-starting. It will be noted that the intermediate section 25 of the blade of Figure 5 may be a symmetrical double convex airfoil section and that the intermediate section of the blade shown in Figure 3 may approach this form. In all of the forms of the invention shown in the drawing the leading and trailing edges of the blades are all in a single plane which is a plane of rotation and is normal to the axis of rotation of the impeller. It will be understood, however, that the leading edge of the blade may be positioned either slightly forwardly or rearwardly of the plane of rotation through the trailing edge, that is, the blade may be given a slight pitch angle for certain conditions of operation. It will be further understood that the impeller blades may be somewhat inclined either forwardly or rearwardly with respect to a radius of such a plane, i. e. the impeller may be "dished," as long as the leading and trailing edges at any radial position along the blade are substantially in a plane normal to the axis of rotation of the blade.

All of the blades of the various modifications described rotate at high speed and develop greater amounts of power than impellers of the prior art. The form of the blades are such that they slip smoothly through the air and produce a minimum of eddy and friction losses. They continue to rotate and develop power at low wind velocities and have sufficient rigidity to prevent fluttering and vibration at high wind velocities. The blades of Figs. 1 to 4 as well as the blade of Fig. 5 start and develop high rotation even at extremely low wind velocities, and this is particularly true of the blade shown in Figs. 1 to 4.

While I have disclosed the preferred embodiments of my invention, changes may be made in the construction and arrangement of the parts of my invention without departing from the spirit thereof and it is my intention to cover in the attached claims any modified forms or structures or the use of mechanical equivalents which may be reasonably included within their scope.

I claim as my invention:

1. A rotatable impeller for wind driven power apparatus comprising a radially extending blade having leading and trailing edges at any radial position along the blade substantially in a plane normal to the axis of rotation of said impeller, said blade being thicker adjacent its leading edge than adjacent its trailing edge and having its forward and rearward faces curved to form convex airfoil surfaces.

2. A rotatable impeller for wind driven power apparatus comprising a radially extending blade having leading and trailing edges at any radial position along the blade substantially in a plane normal to the axis of rotation of said impeller, said blade being thickened adjacent its leading edge and tapering toward its trailing edge to form convex airfoil surfaces on both its forward and rearward faces.

3. A rotatable impeller for wind driven power apparatus comprising a radially extending blade having leading and trailing edges at any radial position along the blade substantially in a plane normal to the axis of rotation of said impeller, said blade being thickened adjacent its leading edge and tapering toward its trailing edge to form convex airfoil surfaces on both its forward and rearward faces, and having a starting surface upon its forward face at an angle to said plane to cause initial movement of said blade.

4. A rotatable impeller for wind driven power apparatus comprising a radially extending blade having leading and trailing edges at any radial position along the blade substantially in a plane normal to the axis of rotation of said impeller, said blade being thickened adjacent its leading edge and tapering toward its trailing edge to form convex airfoil surfaces on both its forward and rearward faces, and having a starting surface at a negative angle to said plane occupying a major portion of the forward face of said blade to cause initial rotation of said impeller.

5. A wind driven impeller blade structure for wind-driven power apparatus comprising radially positioned blades, said blades having leading and trailing edges at any position along the blades positioned in a plane substantially normal to the axis of rotation of said impeller, the windward sides of said blades having sloping surfaces to provide initial starting action to the blades, said sloping surfaces being at a small angle with respect to the pitch line of the blade at the tip thereof, and increasing to an angle of substantially 9° at the hub portions of said blades.

6. A wind driven impeller blade structure for wind-driven power apparatus comprising radially positioned blades, said blades having leading and trailing edges at any position along the blades positioned in a plane substantially normal to the axis of rotation of said impeller, the windward sides of said blades having sloping surfaces to provide initial starting action to the blades, the angle of said sloping surfaces being approximately 5½° to the pitch line of said blades at a point substantially midway between the tips and the hub sections thereof said angle increasing toward the hub of the blades and decreasing toward the tip of the blades.

7. A rotatable impeller for wind driven power apparatus comprising a radially extending blade having leading and trailing edges and formed with a curved surface opposite the windward side of the blades, the pitch line extending between said forward and leading edges of said blade being directly in the plane of rotation of said blades at all portions thereof, and a sloping surface formed on the windward side of said blade at an angle to said pitch line and terminating in the trailing edge and adjacent the leading edge of the blade.

8. A wind driven impeller blade structure for wind driven power apparatus comprising radially positioned blades, said blades having an airfoil section providing surfaces of substantially equal curvature on the faces thereof toward and away from the wind direction said blades being thickened adjacent to the leading edges thereof and having trailing and leading edges substantially in the plane of rotation of said blades at any position along said blades.

9. A wind driven impeller for wind driven power apparatus comprising blades having a thickened section positioned substantially toward the leading edge of said blades, said thickened sections extending to substantially equal distances from the medial line of the blade and being bounded by substantially equal airfoil curves, said blade having leading and trailing substantially in the plane of rotation of said impeller at any position along said blades.

GERHARD H. ALBERS.